(12) United States Patent
Weber

(10) Patent No.: US 11,518,540 B2
(45) Date of Patent: Dec. 6, 2022

(54) AIRCRAFT HAVING AN AIRCRAFT FUSELAGE, A WING ASSEMBLY, AND A TAIL ASSEMBLY, AS WELL AS A SURFACE STRUCTURE CONTAINING A LIGHTNING PROTECTION DEVICE

(71) Applicant: Airbus Operations GmbH, Hamburg (DE)

(72) Inventor: Lutz Weber, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 820 days.

(21) Appl. No.: 16/417,168

(22) Filed: May 20, 2019

(65) Prior Publication Data
US 2019/0382129 A1 Dec. 19, 2019

(30) Foreign Application Priority Data

Jun. 15, 2018 (DE) .......................... 102018114356.7

(51) Int. Cl.
*B64D 45/02* (2006.01)
*H02G 13/00* (2006.01)
(52) U.S. Cl.
CPC ............. *B64D 45/02* (2013.01); *H02G 13/80* (2013.01)
(58) Field of Classification Search
CPC ................................ B64D 45/02; H02G 13/80
See application file for complete search history.

(56) References Cited

U.S. PATENT DOCUMENTS

| 5,493,702 A * | 2/1996 | Crowley ................ H01Q 1/243 343/702 |
| 9,708,076 B2 | 7/2017 | Jones |
| 2008/0170349 A1* | 7/2008 | Stein ...................... B64D 45/02 361/218 |
| 2009/0117322 A1* | 5/2009 | Larsen ................... B32B 33/00 156/60 |
| 2010/0127564 A1 | 5/2010 | Braden et al. |

(Continued)

FOREIGN PATENT DOCUMENTS

| DE | 102007057491 A1 | 6/2009 |
| DE | 102016121923 A1 | 5/2018 |

(Continued)

OTHER PUBLICATIONS

French Written Opinion of Patentability for corresponding French Patent Application No. 1906156 dated May 20, 2021.

*Primary Examiner* — Timothy D Collins
*Assistant Examiner* — Brendan Kroger Schneider
(74) *Attorney, Agent, or Firm* — Greer, Burns & Crain, Ltd.

(57) ABSTRACT

An aircraft of the type disclosed here includes an aircraft fuselage, a wing assembly, a tail assembly, and a surface structure containing a lightning protection device. The surface structure is arranged on the aircraft fuselage, the wing assembly, and the tail assembly. The lightning protection device has a plurality of electrically conductive elements, which are arranged at least as a group of elements in the surface structure. The electrically conductive elements belonging to a group are arranged parallel to one another, at least in some section or sections, and have different spacings with respect to one another, at least in two regions.

15 Claims, 2 Drawing Sheets

(56) References Cited

U.S. PATENT DOCUMENTS

| | | | |
|---|---|---|---|
| 2013/0099772 A1* | 4/2013 | Van Deventer | G01R 31/008 |
| | | | 324/72 |
| 2013/0277372 A1* | 10/2013 | Waku | B60K 15/03177 |
| | | | 428/221 |
| 2014/0197273 A1 | 7/2014 | Steinwandel et al. | |
| 2015/0147183 A1* | 5/2015 | Martin | F01D 5/147 |
| | | | 29/889.6 |
| 2016/0368619 A1* | 12/2016 | Prevost | B64D 45/02 |
| 2018/0050817 A1 | 2/2018 | Le et al. | |
| 2018/0079514 A1* | 3/2018 | Ramakrishnan | B64C 21/00 |

FOREIGN PATENT DOCUMENTS

| | | |
|---|---|---|
| WO | 2013062706 A1 | 5/2013 |
| WO | 2014140583 A2 | 9/2014 |

\* cited by examiner

AIRCRAFT HAVING AN AIRCRAFT FUSELAGE, A WING ASSEMBLY, AND A TAIL ASSEMBLY, AS WELL AS A SURFACE STRUCTURE CONTAINING A LIGHTNING PROTECTION DEVICE

CROSS-REFERENCE TO PRIORITY APPLICATION

This application claims the benefit of, and priority to, German patent application number DE 102018114356.7, filed Jun. 15, 2018. The content of the referenced application is incorporated by reference herein.

TECHNICAL FIELD

Embodiments of the subject matter described herein relate generally to an aircraft having an aircraft fuselage, a wing assembly, and a tail assembly, as well as a surface structure containing a lightning protection device.

BACKGROUND

For protection against lightning strikes, aircraft are protected by a lightning protection device. These are embodied as conductive surfaces and can conduct current close to the surface and thus significantly reduce the risk of penetration of the structure of the aircraft. Devices of this kind are often implemented with foils made from a highly conductive material, which are integrated onto or into the structure of the aircraft. Damage to a fuselage structure can thereby be counteracted.

A lightning strike on an aircraft normally takes the form of a lightning bolt striking an extremity, e.g. a radome or a wingtip, an electric current caused thereby being conducted along the aircraft and normally being discharged via other extremities, e.g. a rudder flap or an APU exhaust pipe, into the atmosphere or the ground. Owing to a predominantly similar pattern of such lightning strikes, certain lightning protection zones which are particularly affected by lightning strikes and consequently have a lightning protection device are often defined.

Patent document DE 10 2016 121 923 A1, for instance, shows a material combination which can be used in an aircraft, including for the production of a lightning protector.

Patent document DE 10 2007 057 491 A1 shows a component for an aircraft, having a resin matrix into which carbon nanotubes are embedded in order to achieve a high conductivity of the component.

BRIEF SUMMARY

With known devices, it is possible, subject to limitations, to provide different zones on a surface of an aircraft with locally adapted lightning protection. It is therefore an object of the disclosure to propose an aircraft which is fitted with an alternative lightning protection device and can be adapted locally in a particularly advantageous and very flexible manner to different lightning protection risks.

The object is achieved by an aircraft having the features of independent claim 1. Advantageous developments can be found in the dependent claims and the following description.

The proposal is for an aircraft having an aircraft fuselage, a wing assembly and a tail assembly as well as a surface structure containing a lightning protection device, said structure being arranged on the aircraft fuselage, the wing assembly and the tail assembly, the lightning protection device having a plurality of electrically conductive elements, which are arranged at least as a group of elements in the surface structure, wherein the electrically conductive elements belonging to a group are arranged parallel to one another, at least in some section or sections, and have different spacings with respect to one another, at least in two regions.

The aircraft can be of any desired design and can comprise the essential main components of an aircraft fuselage, a wing assembly and a tail assembly. This does not mean that other elements or subassemblies are excluded. The wing assembly and the tail assembly could also be combined and not necessarily implemented separately and at a distance from one another. It would likewise be possible for the aircraft fuselage, the wing assembly and the tail assembly to have an integrated form, in which, in particular, the aircraft fuselage merges into the wing assembly and vice versa.

In the sense according to the disclosure, a surface structure should be taken to mean a close-to-the-surface structure of the surface of the aircraft. The surface structure could include the surface of a fuselage skin, a wing assembly skin or a tail assembly skin with a lightning protection device arranged thereon and one or more protective layers arranged thereon, for instance. The concept of the surface structure can therefore also vary, depending on the type of aircraft and of a material of the aircraft fuselage, of the wing assembly and of the tail assembly. However, the precise composition of the surface structure is not essential. At this point it may be pointed out that the outer surface of the aircraft is not aerodynamically compromised by the arrangement of the lightning protection device. Of course, an aerodynamically favorable surface should be maintained without sacrificing the advantageous arrangement of the lightning protection device. The thickness of the conductive elements, the embedding thereof into the surface structure and the covering with one or more protective layers can be matched to one another in such a way that the outer surface is configured in the desired manner and, in particular, is smooth.

One significant aspect of the lightning protection device relates to the use of a plurality of conductive elements which are situated in the surface structure and are capable of conducting a current. The electric current caused by lightning strikes can be conducted close to the surface along the surface structure by the conductive elements in order to prevent damage to the structure of the aircraft. Here, the electrically conductive elements of the lightning protection device together form at least one group and extend parallel to one another, at least in some section or sections. The different spacing of the individual electrically conductive elements can be used for local adaptation of a lightning protection effect.

It is self-evident that it is also possible to arrange a plurality of groups of conductive elements in the surface structure. These can be situated side-by-side, one behind the other or one above the other, i.e. also in an overlapping arrangement, in the surface structure.

In regions with a significantly greater requirement for lightning protection, the selected spacing between the conductive elements can be smaller than in other regions, for instance. If the spacing between individual conductive elements is set to zero, this would correspond to a conventional solution with a foil or a metal grid. These regions could be situated, in particular, on a front side and an upper side of the aircraft.

In regions with a significantly lower requirement for a corresponding lightning protection effect, the selected spacing between the conductive elements could be significantly greater than in other regions. These can be lateral surfaces of the aircraft or a front half of an aircraft fuselage underside.

Thus, the entire surface structure of the aircraft could be fitted with lightning protection, while this can be adapted locally to different demands on the lightning protection. Despite the covering of a predominant part of the aircraft, it is thereby possible to save material and weight overall, and the lightning protection can be adapted in an ideal manner to the requirements, that is to say even without variation in the thickness of a metal foil or the like.

In an advantageous embodiment, the electrically conductive elements are embodied in the manner of bands. In this sense, the electrically conductive elements are elongate and flat, have a main direction of extent and are delimited by two mutually opposite edge regions. A width of the conductive elements, i.e. the distance between the mutually opposite edge regions, is significantly less than the length thereof. The conductive elements can therefore extend as strips in the surface structure of the aircraft, wherein a plurality of strips extends parallel to one another, at least in some section or sections. Through the use of band-type conductive elements, it is also possible to achieve more complex shapes for a covering of the surface structure. It is not absolutely essential to prepare and apply predetermined geometric areas; instead, the strips can also be arranged in a meandering shape or with certain bent shapes in the production of the surface structure.

The electrically conductive elements preferably extend without interruption in the surface structure. Of course, it is also possible for there to be individual elements which are interrupted in a direction of running or are spaced apart from another element in a direction of running.

The electrically conductive elements can comprise a metallic material. In particular, the metallic material could comprise copper, a copper-based alloy, e.g. bronze, aluminum or other metallic materials. In the selection process, a sufficiently high specific electric conductivity and a sufficient achievable current density must be taken into account, in particular.

The electrically conductive elements can furthermore comprise a conductively coated plastic. The plastic could be implemented in the form of a coated band or of a strip. The band or strip can be composed of a single plastic throughout or can have a layered structure comprising a plurality of plastics. In this arrangement, the surface of the conductive elements can have interruptions, openings, recesses, depressions or the like. The type of plastic is unimportant as long as sufficient current carrying capacity or electric conductivity can be achieved by means of the coating. It might also be appropriate to use a strip composed of a thermoplastic or of a thermoset which is flexible and resilient in bending, thus enabling the deformations of the aircraft during flight to be followed. Of course, it is also possible to use polyamides, Kevlar or other materials. The coating can be implemented by metal vapor deposition, for example.

Moreover, the use of carbon allotropes, which can be bonded into the surface structure, would also be conceivable. These could be implemented in the form of carbon nanotubes or graphenes, for instance.

In an advantageous embodiment, the electrically conductive elements have a plurality of fibers, which form a nonwoven, a woven fabric, a non-crimp fabric, a weft-knitted fabric, a braided fabric or a warp-knitted fabric. By means of these types of structure, sheet-like structures can be created which can be adapted very flexibly to a desired shape and a desired profile in the surface structure. These sheet-like structures comprise fibers which are ordered or unordered in braided, woven or stitched-together form. These types of structure can concern, in particular, plastic fibers which are provided with a conductive coating, or metallic fibers.

In an advantageous embodiment, however, the electrically conductive elements can also be solid. A variant of this kind relates, in particular, to strip-shaped sections which are not composed of individual fibers but are produced from a solid material. These could be processed by mechanical methods to reduce the specific weight. It might also be appropriate to provide a metal sheet or a foil with openings and to deform it with a stretching action. This gives rise to an expanded metal with a grid-shaped structure. Copper foils which are processed in this way are also referred to by the term "expanded copper foil" (ECF).

In an advantageous embodiment, a first group of conductive elements is formed, said group extending in the same direction as a longitudinal axis of the aircraft fuselage and being distributed in the circumferential direction on the aircraft fuselage. Consequently, the individual conductive elements of this first group can extend substantially in a longitudinal direction on the aircraft fuselage. They do not necessarily have to have a strictly rectilinear and precisely parallel alignment with the longitudinal axis. However, the overall extent of the electrically conductive elements can preferably be substantially along the longitudinal axis. In this case, two rectilinear and mutually parallel envelope curves arranged opposite one another, enveloping a conductive element along their main direction of extent and, in the process, running parallel to the longitudinal direction or enclosing an angle of up to 25° therewith, are conceivable, for instance. There could be local angle deviations relative to the longitudinal axis here. For example, a conductive element can extend along the longitudinal axis and, at the same time, could have one or more bends which run around one or more windows in the aircraft fuselage. Overall, the conductive elements can also have a kind of zigzag structure or can be arranged in a meandering shape. However, it is expedient for all the conductive elements of a coherent group to be arranged in such a way that they result in a substantially constant spacing between adjacent electrically conductive elements.

The distribution of the electrically conductive elements in the circumferential direction can be performed in such a way that the conductive elements extending substantially along a longitudinal axis are arranged at positions which are distributed over the entire circumference of the aircraft fuselage.

A second group of conductive elements can be formed, said group extending around the aircraft fuselage in the circumferential direction and being distributed along a longitudinal axis on the aircraft fuselage. It is advantageous to arrange the second group on a fuselage section which also includes the wing roots. Similarly to the first group described above, the conductive elements of the second group can be arranged in such a way that two adjacent conductive elements have a constant spacing with respect to one another. Consequently, the conductive elements can form a kind of arrangement of rings or helical lines which are arranged not only at one position along the longitudinal axis but at several.

A third group of conductive elements can be formed, said group extending from the aircraft fuselage to wing assembly tips. Depending on the sweep of the wing assembly, the conductive elements of the third group can be arranged substantially transversely to a longitudinal axis. It is thereby possible to pass a line for electric current between the wing assembly tips. The individual conductive elements of this third group can be parallel to one another. As an alternative, it is also possible, in the wingspan direction, for each of the elements of this group to extend parallel to a chord line associated with a respective relative chord length. Here too, a meandering structure for a zigzag structure can be present and rectilinear and mutually parallel envelope curves can extend parallel to one another or along the chord lines. The conductive elements can also coincide in some region or regions with those of the abovementioned second group, e.g. on a lower side of the wing assembly.

It is conceivable for at least two groups of conductive elements to overlap or intersect in the lightning protection device. In an advantageous embodiment, elements of the overlapping groups can be connected to one another. In particular, this can take place in a region of the surface structure which contains a transition from a wing root to a fuselage. For example, a current conducted along the wing assembly in the chord line direction can be conducted into elements which extend along the longitudinal direction of the aircraft fuselage. The connection between the elements should have as low resistance as possible. In the scenario described, the current flow can be extended over a relatively large area, in which case the expenditure on repair after the lightning strike could be lower.

In an equally advantageous embodiment, the elements of the overlapping groups can be insulated from one another. In this case, the current flow in the event of a lightning strike is concentrated in a smaller area. It is thereby possible, in particular, to reduce the expenditure for production and maintenance.

The individual spacings between the conductive elements can be adapted to various requirements. It might be advisable, for example, to provide certain regions with better lightning protection than other regions of the surface structure. For example, the aircraft can have at least one electric line which is radially on the inside relative to the surface structure, wherein the spacings of the electrically conductive elements are smaller in a region of the surface structure which radially adjoins said line than in regions of the surface structure which are further away therefrom. Consequently, lightning protection directly radially to the outside of the electric line is strengthened locally relative to adjoining regions.

The at least one electric line can be an electric busbar, for instance.

The aircraft fuselage can furthermore have an outer skin, the thickness of which is not constant in the circumferential direction, wherein the spacings between the electrically conductive elements are larger in regions of greater thickness than in regions of lesser thickness. Potential for damage in the event of a lightning strike in a region with a greater material thickness is lower than in a region with a lesser material thickness. It may therefore be expedient to adapt the overlap of the relevant regions to the material thickness in the form mentioned.

Finally, at least one of the aircraft fuselage, the wing assembly and the tail assembly can at least partially comprise plastic. The plastic can be a thermoplastic or a thermoset and can optionally have fiber reinforcement. The lightning protection is suitable especially for structures which are composed of a nonconductive material or contain conductive materials but are not suitable for receiving and conducting relatively high currents. By equipping an externally situated surface structure of a carbon fiber composite material, for example, lower-lying and, where applicable, conductive layers of a structure can be protected.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses of the disclosed subject matter will be found in the following description of the embodiment examples and the figures. Here, all the features described and/or depicted, in themselves and in any desired combination, form the subject matter of the disclosure, even when considered independently of their combination in the individual claims or the dependency references thereof. In the figures, the same reference signs furthermore stand for identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
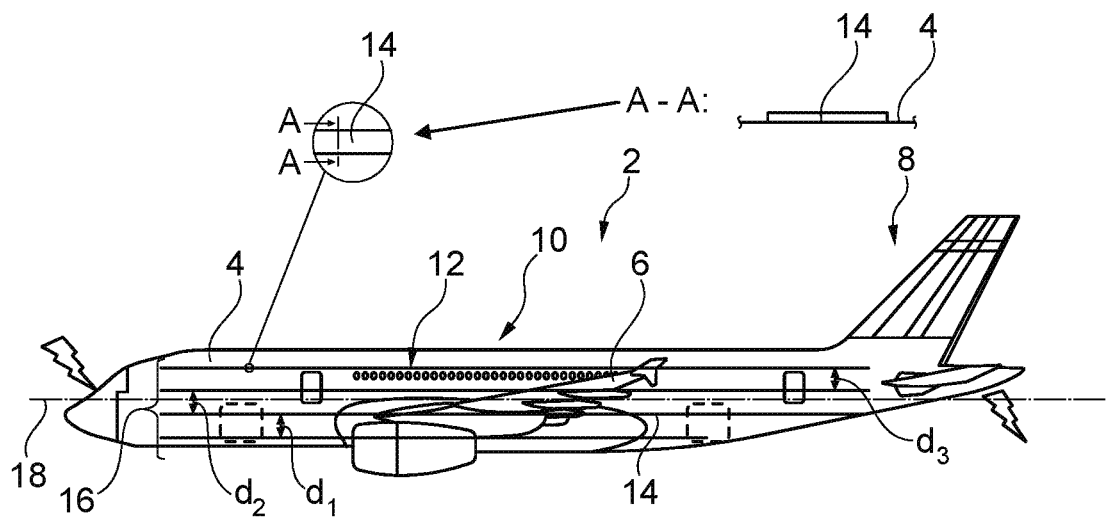
FIG. 1 shows an aircraft in a side view with schematically arranged electrically conductive elements.

FIG. 1 shows an aircraft 2 having an aircraft fuselage 4, a wing assembly 6 and a tail assembly 8. By way of example, the aircraft 2 is embodied as a passenger aircraft, which can be subject to lightning strikes in corresponding weather conditions.

Very schematically, a lightning protection device 12 is arranged on a surface structure 10, said device extending by way of example over significant parts of the aircraft 2. The lightning protection device 12 has a plurality of electrically conductive elements 14, which are embodied in the manner of bands. In a detail view and a partial section, the flat, band-type structure is apparent.

By way of example, there is a first group 16 of electrically conductive elements 14, which extend along a longitudinal axis 18 of the aircraft 2. In this case, the conductive elements 14 could extend parallel to the longitudinal axis 18 or could extend at least substantially along the longitudinal axis 18. This can mean that the significant extent of the conductive elements 14 is in the longitudinal direction 18. Overall, angles of up to 25 degrees relative to the longitudinal axis are possible, for example. However, these angles can be even larger locally if required.

There are spacings d1, d2, d3 etc. between the individual conductive elements 14. The spacings d1 to d3 can differ from one another, depending on the demands on lightning protection. In regions of the surface structure 10 in which greater lightning protection is required, the corresponding spacing d1, d2 or d3 can be reduced, while it can be increased in other regions.

Figure 2A:
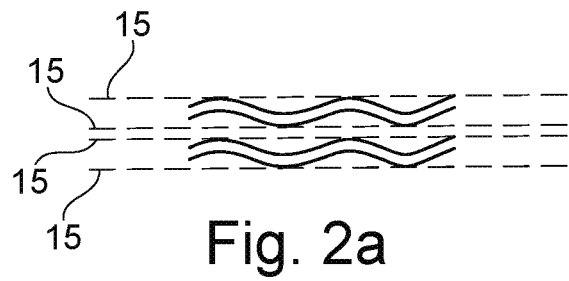
FIGS. 2a and 2b show detail configurations of conductive elements.

FIG. 2a shows, by way of example, two mutually spaced and mutually parallel conductive elements 14, which have a meandering course. Both elements 14 can each be surrounded by rectilinear envelope curves 15 touching the edge of the elements 14. By way of example, these envelope curves extend parallel to one another and could extend parallel to the longitudinal axis 18. As explained above, the envelope curves 15 could also enclose an angle of up to 25° with the longitudinal axis 18.

Figure 2B:
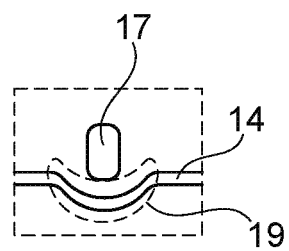

FIG. 2b shows another example of a conductive element 14, which is arranged in the vicinity of a window 17. The conductive element 14 could, for instance, have a bend 19, which runs around the window 17. Overall, however, the conductive element could extend along the longitudinal axis 18.

Figure 3:
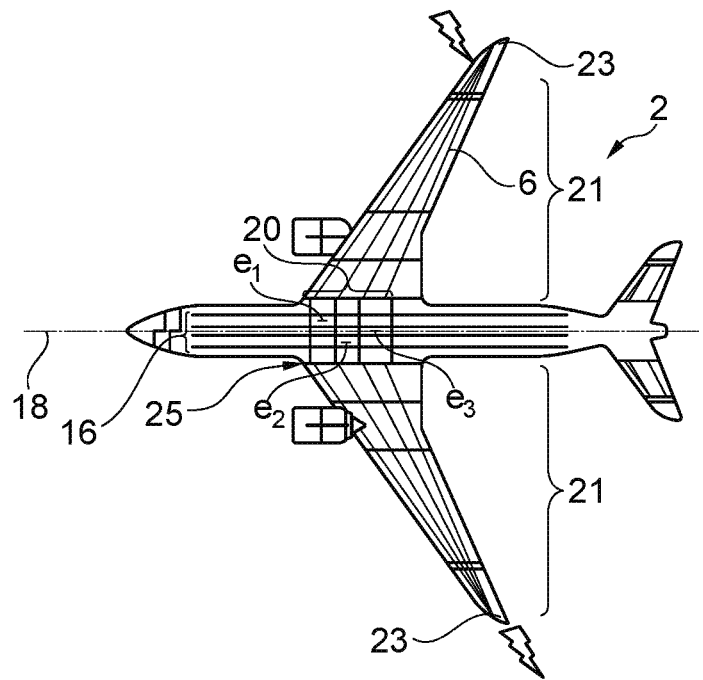
FIG. 3 shows an upper side and a lower side of the aircraft in a split plan view with schematically arranged electrically conductive elements.

FIG. 3 shows an upper side of the aircraft 2 by way of example in the upper half of the plane of the drawing and shows a lower side of the aircraft 2 by way of example in the lower half of the plane of the drawing. Here, in addition to the first group 16 of electrically conductive elements 14, a second group 20 of electrically conductive elements 14, which extend along a circumferential direction of the aircraft fuselage 4, is furthermore provided. Consequently, the elements 14 extend around the aircraft fuselage 4 and in part also regions of the wing assembly 6 or of a wing root 25. The elements of this second group 20 have a spacing e1, e2 and e3 with respect to one another. The spacing e1, e2 or e3 between the individual elements 14 can likewise be performed in order to adapt the lightning protection to local requirements. The second group is situated predominantly in a region of the surface structure 10 of the fuselage 4 which also includes the wing root 25.

As can be seen from FIG. 3, the conductive elements 14 of the second group 20 can overlap with those of the first group 16, resulting in a multiplicity of points of intersection. At these points, the elements of the overlapping groups 16 and 20 can be connected conductively to one another in order to produce current flow over a larger area. This could then reduce the expenditure on repairs after a lightning strike.

As an alternative, the points of intersection could be of insulating design in order to concentrate the current flow. It is thereby possible to reduce the expenditure on production and maintenance.

Furthermore, two third groups 21, which extend on the wing assembly 6, are shown. By way of example, the individual electrically conductive elements 14 each extend over the entire span of one half of the wing assembly 6 and each touch a wing assembly tip 23. As shown here, the conductive elements 14 could extend parallel to individual chord lines and, at the same time, could each follow a relative chord length. In a region at the wing root 25, the conductive elements 14 of the third group 21 can coincide with those of the second group 20 or can be supplemented thereby. Consequently, points of intersection with elements 14 of the first group 16 and of the second group 20 could also arise, and these can be of insulating or electrically conductive design according to criteria mentioned above.

Figure 4:
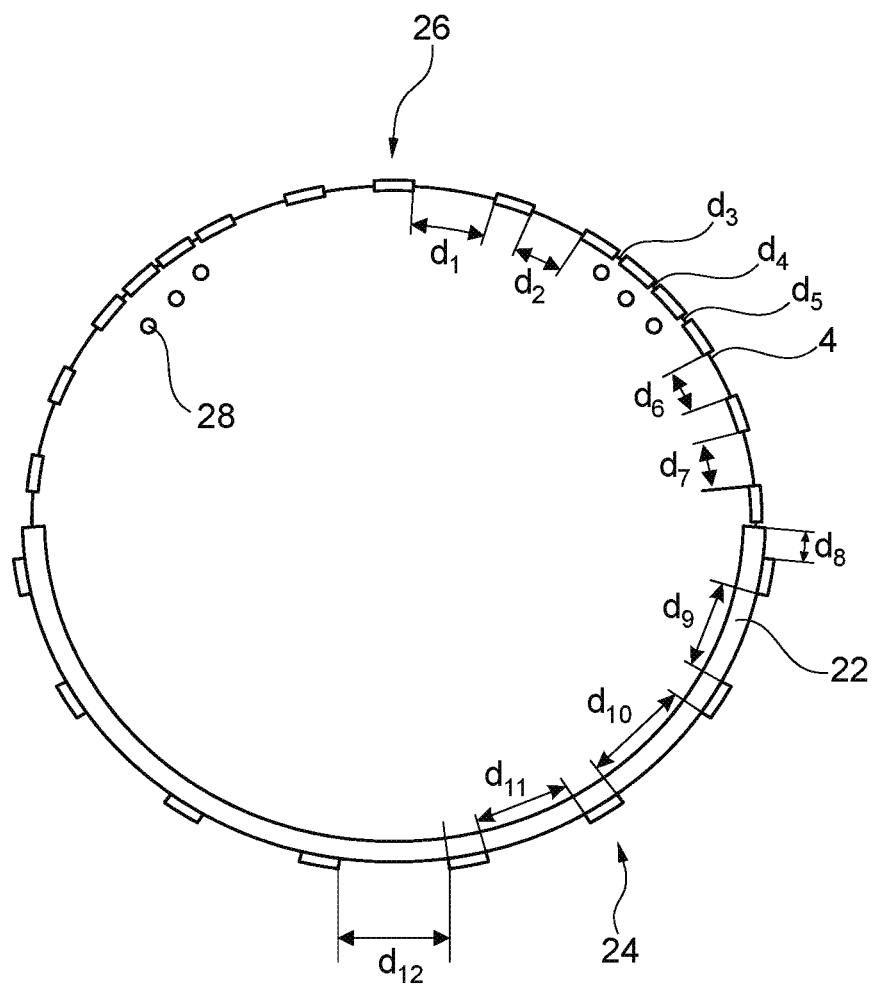
FIG. 4 shows the aircraft fuselage in section with schematically arranged electrically conductive elements.

FIG. 4 shows a cross section of the aircraft fuselage 4 in a very schematic illustration. It should once again be noted here that the outer surface of the aircraft fuselage 4 is not stepped or undulating but is shaped in an aerodynamically favorable and harmonious way, in particular smoothly. The illustration in FIG. 4 is merely intended to indicate that the material thickness of the aircraft fuselage 4 can vary and that electrically conductive elements 14 can be mounted at different positions on the aircraft fuselage.

The aircraft fuselage 4 has an outer skin 22, which has different material thicknesses. In a lower section 24, the material thickness of the fuselage skin 22 is greater than, for example, in an upper section 26. To adapt to the variable material thickness, the selected spacing d1 to d12 of the individual conductive elements 14 can be smaller than on a lower side 24. Here, the spacings between the elements 14 are denoted by d1 to d12 for each side of the fuselage 4, wherein d1 denotes the spacing between an uppermost conductive element 14 and the element 14 which follows it in the circumferential direction, while d12 stands for the spacing between the two lowermost elements 14.

By way of example, it is shown that spacings d8, d9, d10, d11 and d12 belong to the lower fuselage half 24 and are significantly larger than the spacings d1 to d7 in the upper fuselage half 26. Moreover, a plurality of electric bus lines (busbars) 28 is arranged radially on the inside on the upper side 26, by way of example on both sides of the aircraft fuselage 4, wherein the spacings d3, d4 and d5 are significantly smaller in a region situated directly radially on the outside than in all other regions. Damage to the bus lines 28 caused by lightning strikes can thereby be limited to the greatest extent possible.

For the sake of completeness, it should be noted that "having" does not exclude any other elements or steps and "a" or "an" does not exclude a multiplicity. It should furthermore be noted that features which have been described with reference to one of the above embodiment examples can also be used in combination with other features of other embodiment examples described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft comprising:
   an aircraft fuselage;
   a wing assembly;
   a tail assembly; and
   a surface structure comprising a lightning protection device, the surface structure arranged on an outer surface of the aircraft fuselage, on an outer surface of the wing assembly, and on an outer surface of the tail assembly, the lightning protection device comprising a plurality of electrically conductive elements arranged at least as a group of elements in the surface structure,
   wherein the electrically conductive elements belonging to a group are arranged parallel to one another, at least in some section or sections, and have different spacings with respect to one another, at least in two regions.

2. The aircraft according to claim 1, wherein the electrically conductive elements are conductive bands.

3. The aircraft according to claim 1, wherein the electrically conductive elements comprise a metallic material.

4. The aircraft according to claim 1, wherein the electrically conductive elements comprise a conductively coated plastic.

5. The aircraft according to claim 1, wherein the electrically conductive elements have a plurality of fibers that form a fabric.

6. The aircraft according to claim 1, wherein the electrically conductive elements are produced from a solid material.

7. The aircraft according to claim 1, wherein a first group of conductive elements is formed extending in the same direction as a longitudinal axis of the aircraft fuselage and being distributed in the circumferential direction on the aircraft fuselage.

8. The aircraft according to claim 1, wherein a second group of conductive elements extends around the aircraft fuselage in the circumferential direction and being distributed along a longitudinal axis on the aircraft fuselage.

9. The aircraft according to claim 1, wherein a third group of conductive elements extends from the aircraft fuselage to wing assembly tips.

10. The aircraft according to claim 1, wherein at least two groups of conductive elements overlap one another, wherein elements of the overlapping groups are connected to one another.

11. The aircraft according to claim 1, wherein at least two groups of conductive elements overlap one another, wherein elements of the overlapping groups are insulated from one another.

12. The aircraft according to claim 1, further comprising at least one electric line radially on the inside relative to the surface structure, wherein the spacings of the electrically conductive elements are smaller in a region of the surface structure which radially adjoins the at least one electric line than in regions of the surface structure which are further away therefrom.

13. The aircraft according to claim 12, wherein the at least one electric line is an electric bus line.

14. The aircraft according to claim 1, wherein the aircraft fuselage comprises an outer skin having a thickness that is not constant in the circumferential direction, wherein the spacings between the electrically conductive elements are larger in regions of greater thickness than in regions of lesser thickness.

15. The aircraft according to claim 1, wherein at least one of the aircraft fuselage, the wing assembly and the tail assembly at least partially comprises a plastic.

* * * * *